United States Patent [19]

Watanabe et al.

[11] Patent Number: 4,539,569

[45] Date of Patent: Sep. 3, 1985

[54] INK JET RECORDING APPARATUS

[75] Inventors: Takashi Watanabe, Hiratsuka; Masakazu Ozawa, Atsugi; Yutaka Koizumi, Hiratsuka; Haruyuki Matsumoto, Tokyo, all of Japan

[73] Assignee: Canon Kabushiki Kaisha, Tokyo, Japan

[21] Appl. No.: 543,929

[22] Filed: Oct. 20, 1983

[30] Foreign Application Priority Data

Oct. 26, 1982 [JP] Japan .......................... 57-161062[U]
Oct. 26, 1982 [JP] Japan .......................... 57-161063[U]

[51] Int. Cl.[3] .......................................... G01D 15/18
[52] U.S. Cl. .................................. 346/140 R; 346/75
[58] Field of Search ............................ 346/75, 140 R

[56] References Cited

U.S. PATENT DOCUMENTS

| | | | |
|---|---|---|---|
| 4,015,272 | 3/1977 | Yamamori et al. | 346/140 R |
| 4,017,869 | 4/1977 | Meyer et al. . | |
| 4,164,745 | 8/1979 | Cielo et al. . | |
| 4,376,945 | 3/1983 | Hara et al. . | |
| 4,377,814 | 3/1983 | Debesis | 346/140 R X |
| 4,380,771 | 3/1983 | Takatori . | |
| 4,420,764 | 12/1983 | Okada . | |
| 4,432,005 | 2/1984 | Duffield et al. | 346/140 R |

FOREIGN PATENT DOCUMENTS

| | | | |
|---|---|---|---|
| 2418093 | 10/1975 | Fed. Rep. of Germany | 346/140 R |
| 54168018 | 7/1981 | Japan | 346/140 R |

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

An ink jet recording apparatus has an improved head plate having a plurality of recording heads, a plurality of openings corresponding to the outlet port of each recording head, and a guide groove to lead ink liquid from the openings to a discharge port, the guide groove being gradually tapered downwardly to the discharge port.

7 Claims, 4 Drawing Figures

INK JET RECORDING APPARATUS

BACKGROUND OF THE INVENTION

1. Field of the Invention

This invention relates to an ink jet recording apparatus, and, more particularly, it is concerned with an ink jet recording apparatus having an improved construction at the end face of its head plate.

2. Description of the Prior Art

FIGS. 1A and 1B of the accompanying drawing illustrate a conventional ink jet recording apparatus (FIG. 1A is a perspective view of the apparatus, and FIG. 1B is a front view thereof).

In FIGS. 1A and 1B, a reference numeral 7 designates a main body of the ink jet recording apparatus, numerals, 6*a*, 6*b* and 6*c* refer to recording heads of the ink jet, each having a piezo element, and 1*a*, 1*b*, and 1*c* represent openings, into which the distal end of each ink jet nozzle having an ink discharging port can be inserted. A reference numeral 2 designates a head plate integrally formed with the main body 7 of the apparatus, the openings 1*a*, 1*b* and 1*c* being formed in this head plate. Ink feeding tubes 3*a*, 3*b* and 3*c* are respectively connected with the recording heads 6*a*, 6*b* and 6*c*. One end part of each of these ink feeding tubes 3*a*, 3*b* and 3*c* is introduced into any of sub-tanks for ink 4 and 5 containing printing ink of different colors. In the illustrated apparatus, the ink feeding tubes 3*b* and 3*c* are led into the sub-ink-tank 4, so that the recording heads 6*b* and 6*c* print on the recording sheet with the ink in the same color. A cover (not shown) is placed on top of these sub-ink-tanks 4 and 5 to define a hermetically closed space in back of them. Reference numerals 4*a* and 5*a* designate air outlet ports for reducing pressure within the sub-ink-tanks 4 and 5, respectively, and numerals 4*b* and 5*b* refer to tubes communicatively connected with a main ink tank (not shown).

At the time of recording through the recording heads 6*a*, 6*b* and 6*c*, ink liquids in different colors are ejected from the ink jet nozzles. In this case, it sometimes happens that, after the recording heads 6*a*, 6*b* and 6*c* are subjected to a restorative operation, for example, residual ink liquid stays at and around the openings 1*a*, 1*b* and 1*c*. Thus, when ink liquid stays at and around the openings 1*a*, 1*b* and 1*c*, i.e., causes formation of and ink liquid stay, ink liquid which is ejected from the recording heads 6*a*, 6*b* and 6*c* is drawn toward the ink liquid stay, whereby straight-line ejection of the ink liquid is hindered, thus causing poor printing on the recording sheet. Moreover, due to surface tension, inks in different colors at the ink liquid stay on the adjacent openings 1*a* and 1*b* pervade each other, and intermingled ink liquid this gathers at the openings 1*a* and 1*b* as the ink liquid stay. Consequently of this, the ink liquid to be ejected from the recording heads 6*a* or 6*b* toward the recording sheet may carry with it the intermingled ink liquid at the opening 1*a* or 1*b*; hence the color of the printed letters or numerals on the recording sheet is may be misshapen and unsightly. Further, when inks in different colors are mixed, they may produce a deposit as a result of the chemical reaction between them, and such deposit can stay at the openings 1*a* and 1*b* to clog the openings 1*a* and 1*b*, making it impossible for the ink liquid in the recording heads 6*a* and 6*b* to be ejected out of the openings 1*a* and 1*b* and causing poor ink ejection. Furthermore, when the ink liquid still stays at the openings 1*a*, 1*b* and 1*c* even after a restorative operation of the recording heads 6*a*, 6*b* and 6*c*, for example, the unnecessary ink liquid at the openings 1*a*, 1*b* and 1*c* invites imperfect restitution of the recording heads or brings about the trouble mentioned in the foregoing.

SUMMARY OF THE INVENTION

In view of the above-mentioned points inherent in the conventional ink jet recording apparatus, it is a primary object of the present invention to provide an improved ink jet recording apparatus, from which the above-mentioned disadvantages have been eliminated, and which has enabled good recording by improving the construction of the head plate.

According to the present invention, in one aspect of it, there is provided an ink jet recording apparatus which comprises a head plate having a plurality of recording heads of an ink jet type and a plurality H) of openings corresponding to the outlet port of each recording head; and partition plates provided on said head plate to isolate said openings.

According to the present invention, in another aspect of it, there is provided an ink jet recording apparatus which comprises a head plate having a plurality of recording heads of an ink jet type, a plurality of openings corresponding to the outlet port of each recording head, and a guide groove to lead ink liquid flowing downward from said openings in the vicinity thereof to a discharge port, wherein said guide groove is gradually tapered as it proceeds from the position of said openings to the position of said discharge port.

The foregoing object, other objects, as well as specific construction and operations of the ink jet recording apparatus according to the present invention, will become more apparent and understandable from the following detailed description thereof, when read in conjunction with the accompanying drawing.

DETAILED DESCRIPTION OF PREFERRED EMBODIMENT

In the following, the present invention will be described in detail in reference to the preferred embodiment thereof shown in FIGS. 2A and 2B.

Figure 1A:
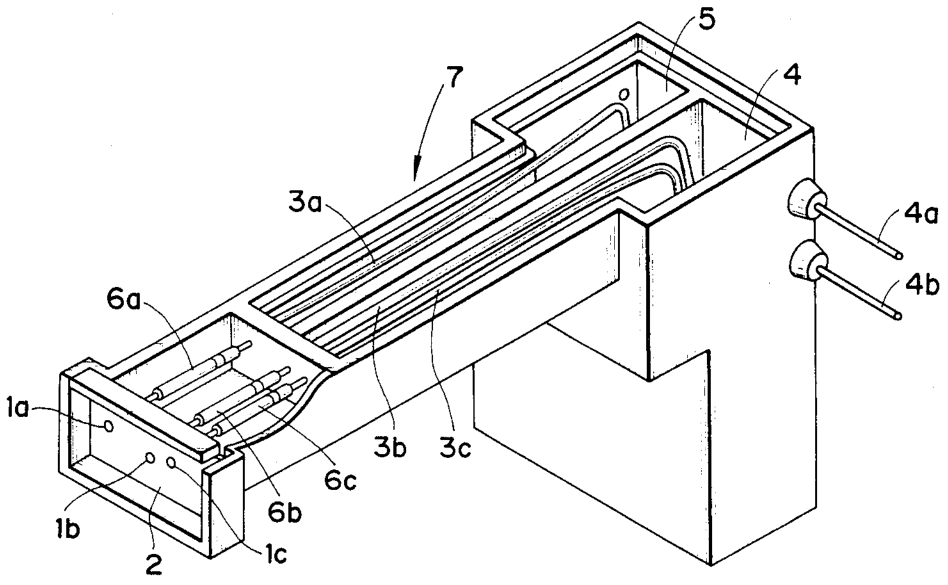
FIG. 1A PRIOR ART
FIG. 1A is a perspective view, with its top part being removed, showing a general construction of a conventional ink jet recording apparatus.
Figure 1B:
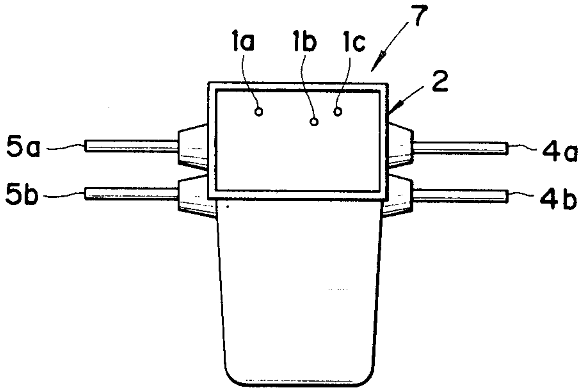
FIG. 1B PRIOR ART
FIG. 1B is a front view of the ink jet recording apparatus shown in FIG. 1A.

Referring to the drawing, the ink-on-demand type recording heads 6*a*, 6*b* and 6*c*, the ink feeding tubes 3*a*, 3*b* and 3*c*, the sub-ink-tanks 4 and 5, the air outlets 4*a* and 5*a*, and the tubes 4*b* and 5*b* are constituent elements of the ink jet recording apparatus, each having the same functions as already explained with reference to FIGS. 1A and 1B; hence explanations of these elements are dispensed with for simplification of this description.

A reference numeral 2′ designates the head plate as a principal constituent element of the ink jet recording apparatus according to the present invention. It has openings 1'a and 1'b and 1'c capable of receiving intromission thereinto of the distal end of the nozzle having the ink discharge port of the recording heads 6a, 6b and 6c, and a partition plate 2'b to isolate the openings 1'a and 1'b provided in the perpendicular direction, and another partition plate 2'c provided in the same perpendicular direction between the openings 1'b and 1'c but below them at some distance. Further, a guide groove 2'a formed at the lower part of the head plate 2' for leading and discharging unnecessary ink liquid staying at and around the openings 1'a, 1'b and 1'c outside the head plate is tapered as it goes downward to the discharge port, hence it has a couple of slanting walls 2'd. The slanting walls 2'd, and in this embodiment the plates 2'b and 2'c, form guide groove means for defining a flow path to a discharge port for residual ink flowing from the openings 1'a, 1'b and 1'c.

In the following, explanations will be given as to the operations of the ink jet recording apparatus of the above-described construction.

The interior of the sub-ink-tanks 4 and 5 is brought to a state of reduced pressure by a pressure reduction means (not shown in the drawing) through the air outlets 4a and 5a, whereby the ink liquid for recording is fed into the sub-ink-tanks 4 and 5 from a main ink tank (not shown in the drawing) through the tubes 4band 5b. The ink liquid in the sub-ink-tanks 4 and 5 passes through the ink feeding tubes 3a, 3b and 3c by the capillary action and reaches the respective recording heads 6a, 6b and 6c. Electrical signals corresponding to the intended recording are applied from a recording circuit (not shown) to the piezo element in each of the recording heads 6a, 6b and 6c, whereby the ink liquid is ejected from the recording heads 6a, 6b and 6c through the openings 1'a, 1'b and 1'c in correspondence with the recording signals. The thus ejected ink liquid sticks onto the recording sheet (not shown) positioned in front of the head plate 2' to complete the intended recording. In the ink jet recording apparatus of such construction, it takes place occasionally that no ink liquid is ejected from the recording heads 6a, 6b and 6c, or, if ejected, the direction of its flying is unstable. In such case, there arises need for performing a restorative operation, wherein the ink liquid is sucked out by means of a liquid sucking device from the front face of the recording heads 6a, 6b and 6c. Even after such restorative operation, however, the ink liquid might remain, from time to time, at and around the openings 1'a, 1'b and 1'c as the ink liquid stay.

Figure 2A:
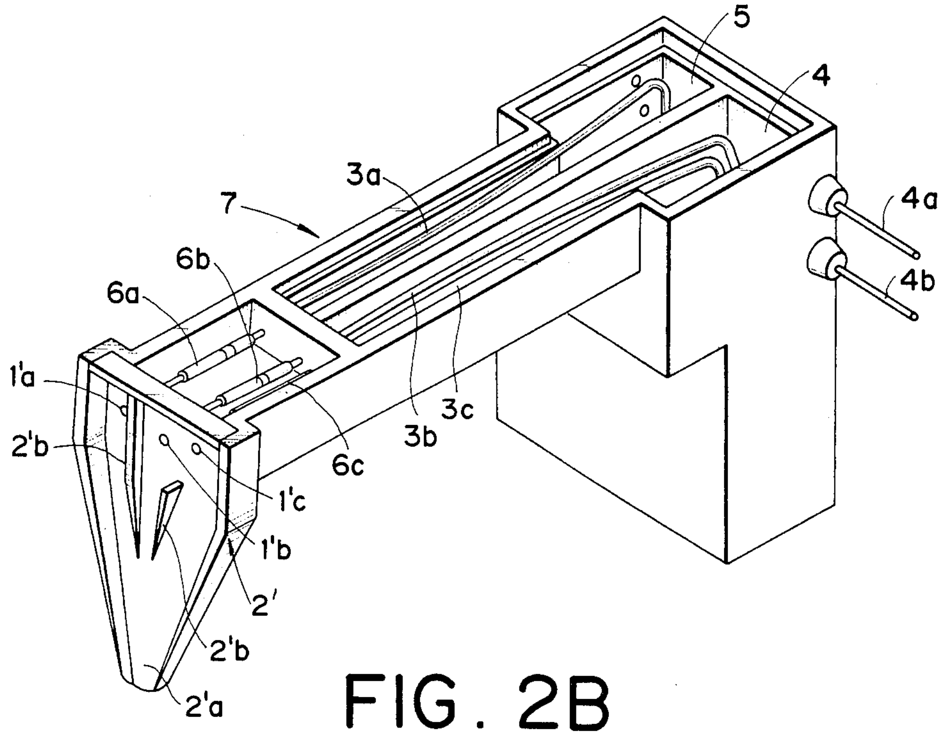
FIG. 2A is a perspective view, with its top being removed, showing a general construction of the ink jet recording apparatus according to the present invention.
Figure 2B:
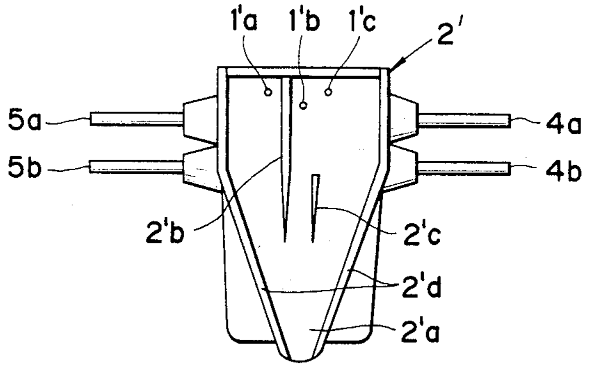
FIG. 2B is a front view of the apparatus shown in FIG. 2A.

With the construction as shown in FIGS. 2A and 2B, however, since the opening 1'a and the opening 1'b are separated each other by the partition plate 2'b, there is no possibility of inks in mutually different color at and around these openings 1'a and 1'b being intermingle. When the quantity of the ink liquid at and around the openings 1'a and 1'b increases and the ink liquid mass expands and reaches the partition plate 2'b, it is drawn to the side of the partition plate 2'b due to the surface tension of the ink liquid and guided by the partition plate 2'b, whereby unnecessary amount of the ink liquid flows down toward the guide groove 2'a. As the consequence of this, the different ink liquids at and around the openings 1'a and 1'b do not mix with each other, hence there is no possibility of the openings 1'a and 1'b being clogged due to deposits formed in the ink liquid, or of the recording taking place in such unsightly color that has heretofor resulted from mixing of the ink liquid. On the other hand, the ink liquids to be discharged from the recording heads 6b and 6c are in the same color and fed from the sub-ink-tank 4, hence there is no problem regarding color mixing, even if the ink liquids staying at and around the openings 1'b and 1'c are intermingled, and there is no necessity for providing the partition plate between the openings 1'b and 1'c. The partition plate 2'c serves for guiding the superfluous ink liquid staying at, and flowing downward from, the openings 1'b and 1'c. For instance, this partition plate 2'c catches at its side walls the ink liquid flowing down from the ink liquid stay at and around the openings due to action of the gravity. When the amount of the ink liquid caught at this wall part of the partition plate is small, the ink liquid stays at this place by its surface tension. When the subsequent ink liquids reach this wall part, the previous and subsequent ink liquids gather at this place to be in a quantity sufficient to flow down further, whereby the consolidated amount of ink liquid is guided by the side walls of this partition plate 2'c to flow downward under gravity toward the guide groove 2'a against its surface tension. Incidentally, when the longitudinal direction of the partition plate 2'b and 2'c is set in the direction leading to the exit of the guide groove 2'a, the superfluous ink liquid flowing down under the guidance of the partition plates 2'b and 2'c reaches the exit port of the guide groove 2'a as it is. Alternatively, if the longitudinal direction of the partition plates 2'b and 2'c is so set that they may be directed to the inclined portion 2'd of the guide groove 2'a, the unnecessary ink liquid which has flowed down along the partition plates 2'b and 2'c reaches this inclined portion 2'd of the guide groove 2'a, is further guided by this inclined portion 2'd to the outlet port of the guide groove 2'a, and finally discharged from it. The ink liquid which has reached the inclined portion 2'd of the guide groove 2'a on its own weight from the ink stay at and around the openings 1'a, 1'b and 1'c without its passing along the partition plates 2'b and 2'c also flows down further to the outlet port of the guide groove 2'a in the same manner as mentioned above. These ink liquids which have reached the outlet port are then absorbed into an absorbent material such as felt, etc. (not shown in the drawing). Further, since the width of the guide groove 2'a at its upper part is taken sufficiently broad, the ink liquid staying at and the openings 1'a, 1'b and 1'c can be gathered without failure and discharged outside. As stated above, since the superfluous ink liquid at and around the openings 1'a, 1'b and 1'c flows down one after the other, and is removed therefrom, the amount of ink at the ink stay can always be kept to a minimum, hence there is no possibility of the ink liquid which has been discharged from the recording heads 6a, 6b and 6c being hindered its straight-line emission. Moreover, the head plate 2' may be provided either intergrally with the main body 7 of the ink jet recording apparatus, or mounted on the main body 7 as a separate part. It should be noted incidentally that the head plate 2' is applicable to any type of recording head of the ink jet type, for example, utilizing a heat generating resistive element, etc. and is, not limited to one utilizing the piezo element. Furthermore, the partition plate 2'c may desirably be provided between the openings 1'b and 1'c, like the partition plate 2'b, which makes it possible to reduce the amount of the ink staying at and around the openings.

Since the ink jet recording apparatus according to the present invention is so constructed and operated as explained in the foregoing, inks in different colors are not intermingled at the time of recording, whereby recording in clear and distinct colors can always be secured, and, further, poor ejection of the ink due to clogging of the ink discharge nozzles and openings can be avoided. Furthermore, since no ink stays at and around the ink discharge port in the recording head, straight-line emission of the ink can be maintained, and accurate printing can always be effected. In addition, since the ink at the ink stay is gathered totally, and guided to the discharge port for discharge, the recording sheet is not stained with the ink.

What we claim is:

1. An ink jet recording apparatus comprising:

a recording head having a plurality of outlet ports for ejecting ink; and head plate means having a plurality of openings corresponding with said plurality of outlet ports for ejection of ink through said openings, guide groove means formed by walls on said head plate means for defining a flow path to a discharge port for residual ink flowing from said openings and at least one partition plate disposed on said head plate means to divide said openings into at least two groups for substantially preventing residual ink from an opening of one said group from mixing with residual ink from an opening of another said group, wherein said partition plate is spaced apart from and located non-contiguous with said openings.

2. An ink jet recording apparatus comprising:

a recording head having a plurality of outlet ports for ejecting ink;

head plate means having a plurality of openings corresponding with said plurality of outlet ports for ejection of ink through said openings, guide groove means formed by walls on said head plate means for defining a flow path to a discharge port for residual ink flowing downwardly from said openings, wherein said guide groove means is gradually tapered from the location of said openings to the location of said discharge port, and at least one partition plate disposed on said head plate means to divide said openings into at least two groups for substantially preventing residual ink from an opening of one said group from mixing with residual ink from an opening of another said group, wherein said partition plate is spaced apart from and located non-contiguous with said openings.

3. An ink jet recording apparatus comprising:

an ink-on-demand recording head having head plate means with a plurality of openings for the ejection of ink;

a plurality of ink tanks for storing inks of different colors for ejection through different said openings; and groove means having a groove formed by walls on said head plate means for defining a flow path to a discharge port for residual ink flowing downwardly from said openings, said groove means having at least one partition plate disposed on said head plate means to divide openings through which different colors of ink are ejected into at least two groups for substantially preventing mixing of residual ink of different colors, wherein said partition plate is spaced apart from and located non-contiguous with said openings.

4. The ink jet recording apparatus according to claim 3, wherein said groove means is tapered at the downstream side thereof.

5. The ink jet recording apparatus according to claim 1, 2 or 3, wherein said recording heads are each provided with a piezo element.

6. The ink jet recording apparatus according to claim 2, wherein said recording heads are each provided with a piezo element.

7. The ink jet recording apparatus according to claim 3, wherein said recording heads are each provided with a piezo element.

* * * * *

UNITED STATES PATENT AND TRADEMARK OFFICE

CERTIFICATE OF CORRECTION

PATENT NO. : 4,539,569

DATED : September 3, 1985

INVENTOR(S) : TAKASHI WATANABE, ET AL.

It is certified that error appears in the above-identified patent and that said Letters Patent is hereby corrected as shown below:

Column 1, line 46, change "and" to --an--;
line 54, change "this" to --thus--;
line 55, delete "of this";
line 61, change "the" to --a--.

Column 2, line 17, delete "H)";
line 31, insert --and-- after "object".

Column 3, line 26, change "4band" to --4b and--;
line 28, delete "the" (second occurrence);
line 52, insert --from-- before "each";
line 54, change "intermingle" to --intermingled--.

Column 4, line 12, delete "the" (first occurrence);
line 58, insert --one-- before "utilizing".

Column 6, line 30, delete "2 or 3,".

Signed and Sealed this

*Sixth* Day of *May 1986*

[SEAL]

*Attest:*

DONALD J. QUIGG

*Attesting Officer* *Commissioner of Patents and Trademarks*